(12) United States Patent
Clarke

(10) Patent No.: US 11,464,175 B1
(45) Date of Patent: Oct. 11, 2022

(54) PROTECTIVE COVER SYSTEM FOR PROTECTING FRUITS, VEGETABLES AND OTHER PRODUCE

(71) Applicant: Gary M. Clarke, Sunrise, FL (US)

(72) Inventor: Gary M. Clarke, Sunrise, FL (US)

( * ) Notice: Subject to any disclaimer, the term of this patent is extended or adjusted under 35 U.S.C. 154(b) by 0 days.

(21) Appl. No.: 17/175,211

(22) Filed: Feb. 12, 2021

Related U.S. Application Data

(60) Provisional application No. 62/975,826, filed on Feb. 13, 2020.

(51) Int. Cl.
*A01G 13/02* (2006.01)

(52) U.S. Cl.
CPC ................................. *A01G 13/0237* (2013.01)

(58) Field of Classification Search
CPC .. A01G 13/0243; A01G 13/237; A01G 13/10; A01G 2013/006; A01G 13/0231; B65D 85/34; G09F 2007/1804
See application file for complete search history.

(56) References Cited

U.S. PATENT DOCUMENTS

| | | | |
|---|---|---|---|
| 4,829,707 A * | 5/1989 | Koffler | A01G 13/02 47/28 |
| 5,323,566 A * | 6/1994 | Mills | A01G 13/00 47/58 |
| 5,406,746 A | 4/1995 | Hoshino | |
| 5,456,043 A | 10/1995 | Dacon, Sr. | |
| 5,479,741 A * | 1/1996 | Underwood | A01G 13/00 47/30 |
| 5,535,543 A | 7/1996 | Alexander | |
| 5,974,729 A | 11/1999 | Clark | |
| 6,505,438 B1 | 1/2003 | Hsia | |
| 6,612,440 B1 | 9/2003 | Agulnik | |
| 7,003,913 B1 | 2/2006 | Smith | |
| 8,074,396 B2 | 12/2011 | Foix Robert et al. | |
| 10,327,436 B2 | 6/2019 | Bevacqua | |
| 2010/0034927 A1* | 2/2010 | Agustin | B65D 85/34 426/87 |

(Continued)

FOREIGN PATENT DOCUMENTS

| | | |
|---|---|---|
| AU | 2012258445 | 6/2013 |
| ES | 2131458 | 7/1999 |
| GB | 2215173 | 9/1989 |

(Continued)

*Primary Examiner* — Joshua E Rodden
*Assistant Examiner* — Henry Hooper Mudd
(74) *Attorney, Agent, or Firm* — John Rizvi; John Rizvi, P.A.—The Patent Professor

(57) ABSTRACT

A protective cover system for protecting produce growing on trees and plants includes a hollow, protective cover having an end wall and a sidewall defining a partially enclosed interior space. The device includes an opening that allows the produce item to be received and secured within the interior space. The sidewall includes one or more elongated slots for securing the device on tree branches and plant vines and the produce item within the interior space. An optional installation kit may be provided including a pole adapter having a socket that receives an optional pole. The pole adapter is inserted into a cavity formed in a pole adapter receptacle on the device when placing the device on fruits on trees. The pole and pole adapter are used to facilitate placement of the device on fruits on trees from ground level.

21 Claims, 12 Drawing Sheets

(56) References Cited

U.S. PATENT DOCUMENTS

2019/0159408 A1 5/2019 Fletcher
2020/0113139 A1* 4/2020 Carabelaian ........... A01G 13/10

FOREIGN PATENT DOCUMENTS

| GB | 2471199 | 12/2010 |
| KR | 200227386 | 6/2001 |
| KR | 20090006366 | 1/2009 |
| KR | 20120097361 | 9/2012 |

* cited by examiner

PROTECTIVE COVER SYSTEM FOR PROTECTING FRUITS, VEGETABLES AND OTHER PRODUCE

FIELD OF THE INVENTION

This application claims the benefit of U.S. Provisional Patent Application No. 62/975,826, filed on Feb. 13, 2020, which is incorporated herein by reference in its entirety.

FIELD OF THE INVENTION

The present invention relates generally to devices for protecting produce growing on trees or plants, and more particularly, to a protective cover system or device adapted to be secured to tree branches or plant vines to protect produce including fruits or vegetables from being damaged.

BACKGROUND OF THE INVENTION

Produce such as fruit or vegetables growing on tree or plant vines grown for human consumption often suffer from damage caused by animals, wind, rain, hail, sun, etc. Such damage may range from minor aesthetical flaws, which may reduce the sale price of the produce or render the produce more difficult to sell, to major deterioration or destruction of the produce, which may cause serious economic loss and distress to the farmer or farming organization.

In an attempt to solve or alleviate the problem above, certain produce-protecting solutions have been developed. Examples of conventional devices to protect produce growing on tree or plant vines include cages, plastic bags, fabric bags, spheres, nets, and capsules, all of which are typically manually placed on the produce. For example, in the event of protecting fruit on trees, these conventional products require raising and placement of the produce-protecting device on the fruit in trees. This requires workers to climb the tree or be raised to the level of the fruit in order to place the devices on the fruit.

Furthermore, some of the aforementioned conventional devices fail to provide a satisfactory solution to the problem of animals gaining access to the fruit. For example, animals are often able to tear through some of these conventional devices, such as plastic and fabric bags, and damage the fruit rendering it unfit for human consumption.

Accordingly, there is a need for a solution to at least one of the aforementioned problems and provide a successful alternative to existing produce-protecting devices, and in particular, to plastic and fabric bags.

SUMMARY OF THE INVENTION

The present invention is directed to a device for protecting produce growing on trees and plants. The device includes a protective cover having one or more walls, such as an end wall and a sidewall extending from the end wall, defining an interior space for receiving the produce. An end of the protective cover opposite to the end wall includes an opening in spatial communication with the interior space. The opening allows the produce item to be placed into the interior space. The protective cover includes one or more elongated slots for securing the protective cover on the tree and plant vines.

In an exemplary embodiment, the protective cover may include an elongated slot formed in the sidewall that extends from the bottom of sidewall to the end wall and another elongated slot formed in the end wall that extends from the sidewall to a medial region on the end wall.

In another aspect, the protective cover may include one or more elongated slots formed in the sidewall that extend from the bottom of the sidewall towards the end wall. The elongated slots are configured for receiving a tree or plant vine and securing the produce item within the interior space.

In another aspect, one or more tabs may extend from an edge of one or more of the elongated slots formed in the end wall and/or sidewall for receiving and securing a tree or plant vine in the elongated slot and securing the produce item within the interior space.

In another aspect, the protective cover system may further include a pole adapter having a socket configured to disconnectably receive a pole. The pole may be installed into the socket of the pole adapter and the pole adapter may be inserted into a cavity formed in a pole adapter receptacle on the device when placing the device on fruits on tree branches. The pole and pole adapter may be used to facilitate placement of the device on fruits on tree branches from ground level.

In a first implementation of the invention, a protective cover system for protecting one or more produce items may include a generally rigid, protective cover defining an interior space configured to receive at least one produce item. The protective cover may include an opening providing access to the interior space for inserting the at least one produce item through the opening and into the interior space. The protective cover may further include a pole adapter receptacle defining a cavity. A pole adapter may be provided as a separate piece relative to the protective cover and may be configured to extend from and be carried by a pole. The pole adapter may be slidably and removably insertable into the cavity of the pole adapter receptacle. The protective cover system may be configured to adopt an assembled configuration in which the pole adapter is removably inserted in the cavity of the pole adapter receptacle and the pole adapter carries a pole such that the pole extends away from the interior space of the protective cover in a longitudinal direction.

In a second aspect, the protective cover may include an end wall and a sidewall extending from the end wall. The end wall and the sidewall may define the interior space of the protective cover. The opening may be provided at an end of the sidewall opposite the end wall.

In another aspect, the sidewall may extend from and along a peripheral edge of the end wall and may encircle the interior space of the protective cover.

In another aspect, the sidewall of the protective cover may be arranged generally parallel to the longitudinal direction when the protective cover system is arranged in the assembled configuration.

In another aspect, the end wall of the protective cover may be arranged generally transverse to the longitudinal direction when the protective cover system is arranged in the assembled configuration.

In yet another aspect, the cavity of the pole adapter receptacle may be elongately formed along the longitudinal direction.

In another aspect, the protective cover may further include one or more elongated slots formed along the protective cover and configured to receive a tree branch or plant vine associated to the at least one produce item received within the interior space and/or to allow the passage of air, water, pesticides, and/or other substances or products.

In another aspect, at least one of the elongated slots may include an inwardly-directed tab providing a narrowing of the slot.

In another aspect, at least one of the elongated slots may extend in the longitudinal direction.

In yet another aspect, at least one of the elongated slots may extend from the end of the sidewall opposite the end wall towards the end wall.

In another aspect, the elongated slots may include a first elongated slot extending from the end of the sidewall opposite the end wall to the end wall and a second elongated slot extending from the first elongated slot and along the end wall.

In another aspect, the second elongated slot may extend from the first elongated slot, partially across the end wall and towards an opposite side of the end wall, at which the pole adapter receptacle may be located.

In another aspect, the pole adapter may be disconnectably attachable to a pole.

In yet another aspect, the protective cover system may further include the pole.

In another aspect, the pole adapter may include an elongated recessed portion defined by a side surface and a proximal end surface. In the assembled configuration of the protective cover system, an edge of the protective cover may rest against the proximal end surface of the elongated recessed portion of the pole adapter.

In another aspect, the side surface of the elongated recessed portion of the pole adapter may be configured to conform to an outer side of the protective cover on which the side surface rests when the protective cover system is arranged in the assembled configuration.

In another aspect, the pole adapter may further include a tab extending from the proximal end surface of the elongated recessed portion in spaced-apart relationship with the side surface of the elongated recessed portion of the pole adapter, such that a gap is defined between the tab and the side surface. In the assembled configuration of the protective cover system, the protective cover may be received within the gap.

In yet another aspect, the pole adapter may be non-rotationally received in the cavity of the pole adapter receptacle when the protected cover assembly is arranged in the assembled configuration.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a protective cover system configured to cover and protect produce items including, but not limited to, fruits and vegetables growing on trees or plant vines including produce items growing on plants on the ground.

Figure 1:
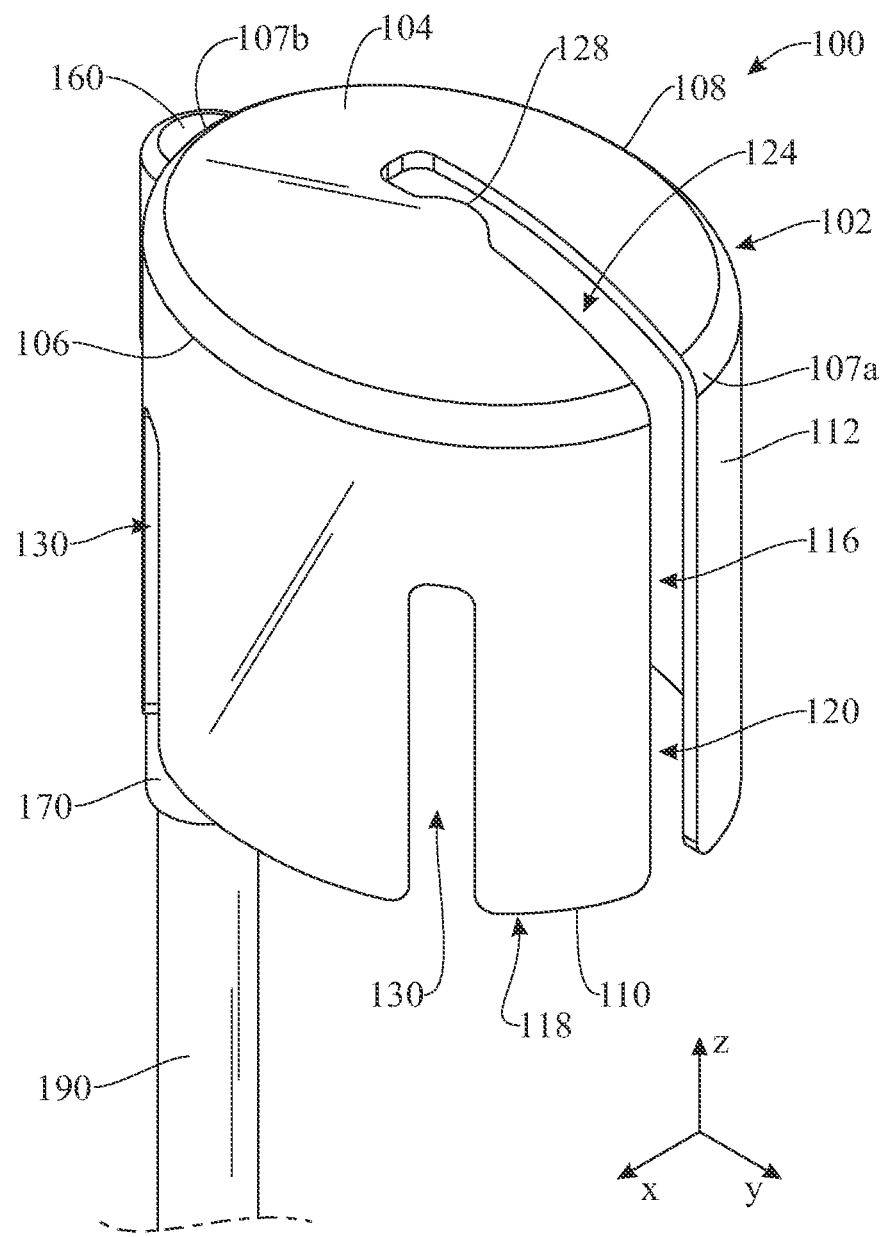
FIG. 1 presents a top isometric view of a protective cover for produce in accordance with an exemplary embodiment of the protective cover system of the present invention and an optional installation kit including a pole adapter installed in the protective cover and a pole connected to the pole adapter.
Figure 2:
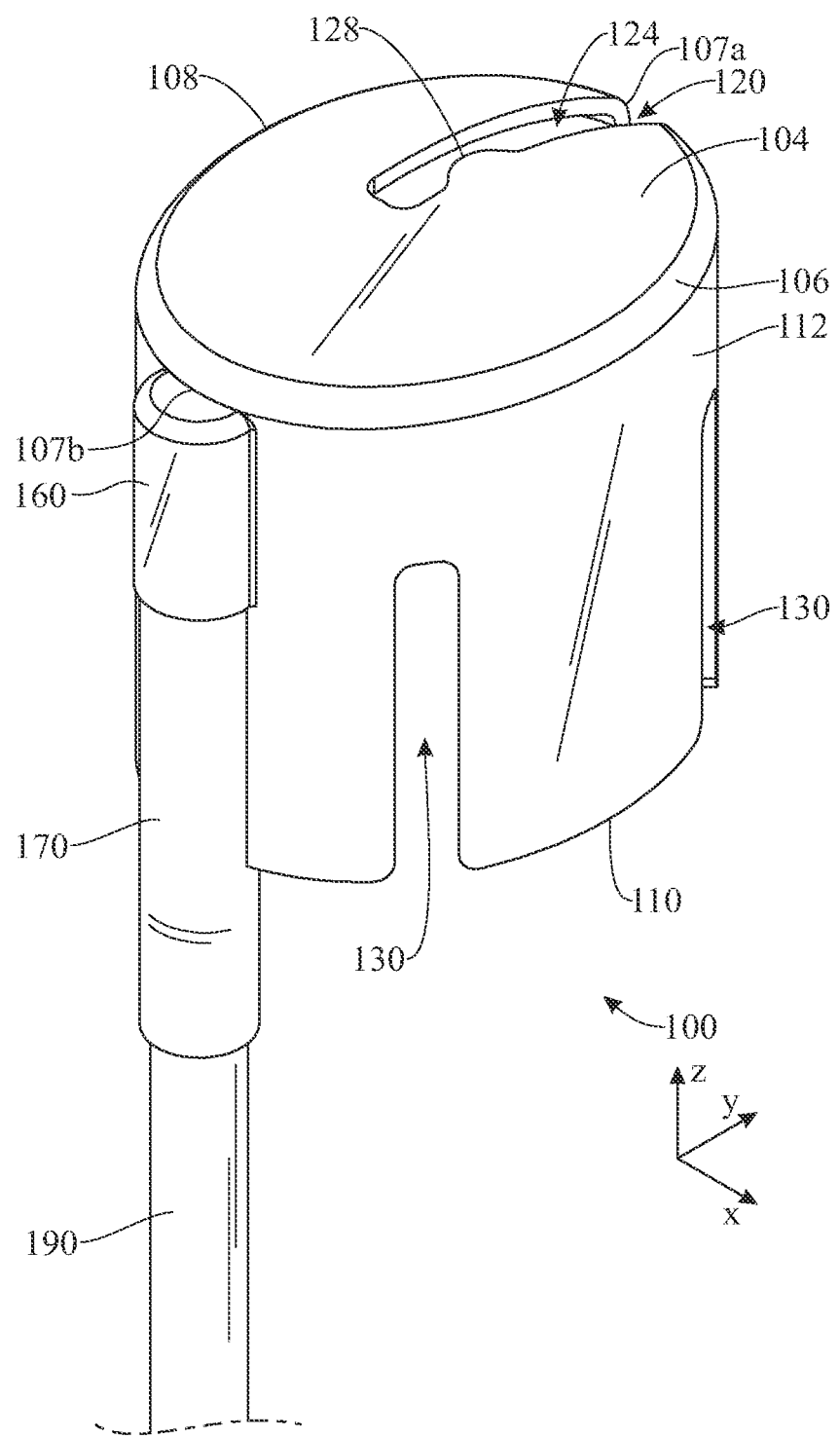
FIG. 2 presents another top isometric view of the protective cover, pole adapter and pole illustrated in FIG. 1.
Figure 3:
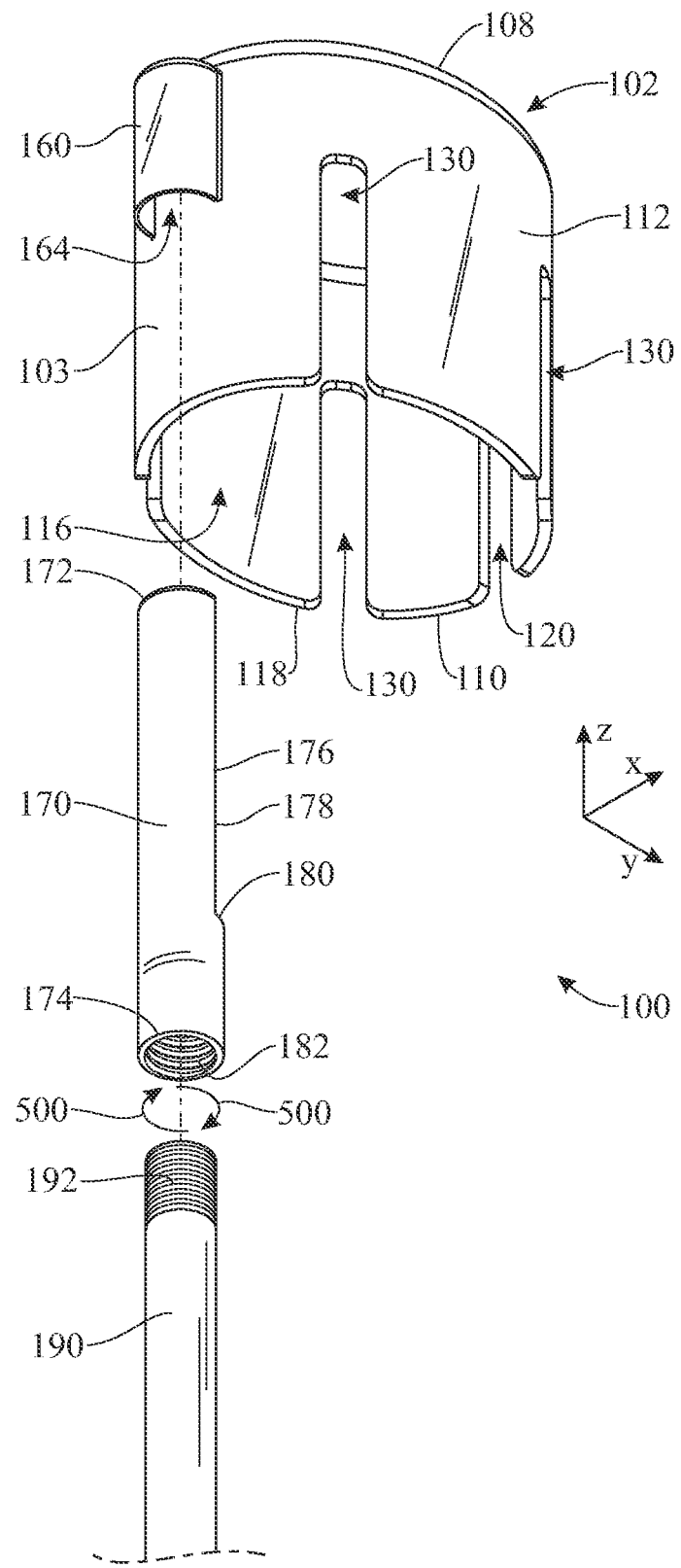
FIG. 3 presents an exploded, bottom isometric view of the protective cover, pole adapter and pole illustrated in FIG. 1, with the pole adapter removed from the pole adapter receptacle on the protective cover and the pole removed from the socket of the pole adapter.

Referring initially to FIGS. 1-3, there is illustrated a device or protective cover system 100 for protecting produce, such as, but not limited to, produce growing on tree or plant vines, in accordance with an exemplary embodiment of the present invention. As will be described in greater detail hereinafter, in some embodiments, the protective cover system 100 may include an installation or placement kit including a tool or pole adapter 170 and a tool or pole 190. The pole 190 may be any stick or pole including a broom pole, but this is not meant to be limiting.

The protective cover system 100 includes a protective cover 102 formed as a hollow body comprising an interior space 116 configured to receive one or more fruits or other produce items therewithin. The protective cover 102 includes a top or end wall 104 at a top or first end 108 of the protective cover 102, and a sidewall 112 extending from the end wall 104, such that the end wall 104 and sidewall 112 define the aforementioned interior space 116 of the protective cover 102 (see also FIG. 5). In some embodiments, such as the present embodiment, the sidewall 112 may extend along a longitudinal direction z, forming a skirt which encircles the interior space 116. The sidewall 112 may be disposed substantially perpendicular to the end wall 104, i.e., substantially along transverse direction x and lateral direction y (wherein directions x and y are generally perpendicular to each other and to direction z, said three directions forming a three-dimensional orthogonal coordinate system). In some embodiments, such as the present embodiment, the top or end wall 104 may be curved, and preferably outwardly curved or convex, thus having a component or dimension along the longitudinal direction z, as shown. The sidewall 112 extends from and along, and encircles, a peripheral edge 106 of the end wall 104. As best shown in FIG. 3, the sidewall 112 forms an opening 118 at a bottom or second end 110 of the protective cover 102 opposed from the first end 108 at which the end wall 104 is located. The end wall 104 and opening 118 are thus provided at opposite longitudinal ends (e.g., top and bottom ends) of the sidewall 112. Thus, in the present embodiment, the protective cover 102 is formed as an inverted cup, having a downward facing, bottom opening (opening 118) and an interior space 116 extending upward (i.e. longitudinally) from the opening 118. The interior space 116 is partially enclosed, allowing produce items to be inserted into the interior space 116. For example, in the present embodiment, the opening 118 opens into the interior space 116, allowing for the insertion of a produce item through the opening 118 and into the interior space 116 so that the interior space 116 receives the produce item when the protective cover 102 is secured to the tree branch or plant vine.

Figure 4:
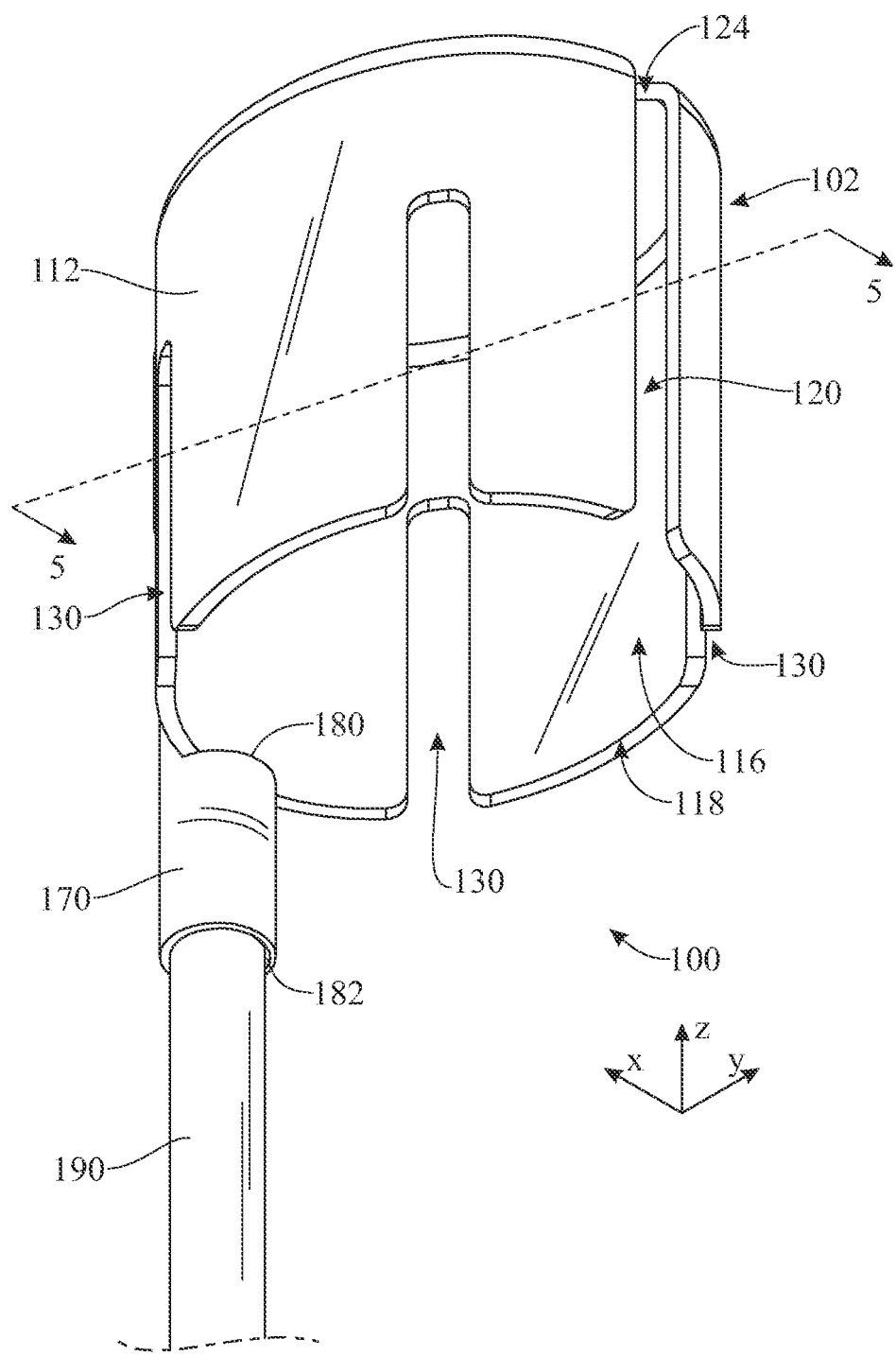
FIG. 4 presents a bottom isometric view of the protective cover, pole adapter and pole illustrated in FIG. 1, with the pole adapter inserted into the pole adapter receptacle on the protective cover and the pole attached to the pole adapter.

As best shown in FIG. 4, the protective cover 102 may include an elongated slot 120 formed in the sidewall 112. The elongated slot 120 may extend from the second end 110 of the protective cover 102 to the end wall 104 at the first end 108 of the protective cover 102. In some embodiments, as shown, the elongated slot 120 may extend in the longitudinal direction z and may be substantially straight. As shown in FIG. 2, the elongated slot 120 of the present embodiment is connected to an elongated slot 124 formed in the end wall 104. The elongated slot 124 extends from the peripheral edge 106 of the end wall 104, where the elongate slots 120 and 124 connect to one another, and may extend to a medial region of the end wall 104. In some embodiments, as shown, the elongate slot 124 may extend from a first side 107a of the peripheral edge 106 of the end wall 104 at which the end of the elongate slot 120 is located, towards an opposite, second side 107b of the peripheral edge 106 of the end wall 104, at which a pole adapter receptacle 160 (described hereinafter) is generally located. In some embodiments, as show, the elongated slots 120 and 124 may jointly form a generally L-shaped slot, extending longitudinally across the sidewall 112 and laterally along the end wall 104. The elongated slots 120 and 124 are configured to receive a section of a tree branch or plant vine and to secure the protective cover 102 to the tree branch or plant vine with the produce item at least partially housed within the interior space 116 of the protective cover 102.

In some embodiments, such as the present embodiment, the protective cover 102 may include at least one protrusion or tab 128 disposed along and extending from one or both edges of the elongated slot 124 such that the tab(s) 128 provide a width reduction of the elongated slot 124. The one or more tabs 128 are configured to constitute somewhat of an obstacle to an extraction of the tree branch or plant vine along the elongated slot 124 from the medial region towards the periphery of the end wall 104, in order to retain the tree branch or plant vine within said medial region. However, the one or more tabs 128 are also shaped and sized to allow the tree branch or plant vine to pass over the tab(s) 128 and through the elongated slot 124 in the event that a sufficient force is applied on the protective cover 102 or branch/vine to move the branch or vine along the elongate slot 124 and overcome the one or more tabs 128. In summary, the one or more tabs 128 are configured to secure the tree branch or vine within the elongated slot 124 in the medial region and the produce item within the interior space 116 of the protective cover 102. In some embodiments, such as the present embodiment, the one or more tabs 128 may be arcuate or rounded, to safeguard the tree branch or plant vine as it passes thereover when inserting or removing the tree branch or plant vine into or out of the elongate slot 124.

While not expressly shown, it is contemplated that the elongate slot 120 on the sidewall 112 may include one or more tabs similar to the one or more tabs 128 described heretofore. Furthermore, in embodiments in which there are two or more tabs 128 disposed at various locations on the edges of elongated slot 120 and/or elongate slot 124, the plurality of tabs 128 may have the same or varying shapes and/or sizes. Embodiments are also contemplated in which the elongated slots 120 and 124 may be of varying shapes, lengths, and widths.

Alternatively or additionally to the aforementioned elongated slots 120 and 124, the protective cover 102 may include one or more elongated slots 130 formed in the sidewall 112 and extending from the second end 110 of the protective cover 102 towards the first end 108 of the protective cover 102. In some embodiments, the one or more elongated slots 130 may extend in the longitudinal direction z. Alternatively or additionally, the one or more elongated slots 130 may be parallel to the elongated slot 120. For instance, in the present embodiment, the one or more elongated slots 130 are formed longitudinally and also parallel to the elongated slot 120. In some embodiments, the one or more elongated slots 130 may extend a distance less than the full height (i.e. dimension along the longitudinal direction z) of the sidewall 112, i.e. may not reach the peripheral edge 106 of the end wall 104, at which the sidewall 112 ends. The one or more elongated slots 130 may include a plurality of elongated slots 130 spaced at discrete or spaced-apart locations around the periphery of the sidewall 112; the spaced-apart locations may be equally-spaced intervals, non-equally spaced intervals, or combinations thereof. The one or more elongated slots 130 are configured to allow the passage therethrough of air, water, pesticides, and/or other substances, agents or products that may contribute to enhance the produce growth, for instance and without limitation. In the present embodiment, there are four elongated slots 130 formed in the sidewall 112 of the protective cover 102 illustrated in FIGS. 1-3. However, the present embodiment is not meant to be limiting. Instead, the number, shape, length and/or width of the elongated slots 130 may vary. Furthermore, one or more of the elongated slots 130 may include one or more tabs, similar to the tab 128 described heretofore, which may be disposed at varying locations on the edges of elongated slots 130 of the same or varying shapes.

As shown in FIG. 3, the protective cover 102 may include a pole adapter receptacle 160 disposed on the sidewall 112 of the protective cover 102 opposed to the elongated slot 120. The pole adapter receptacle 160 includes a cavity 164, which is separate from the interior space 116 of the protective cover 102, as shown. In some embodiments, the cavity 164 can have a substantially D-shaped cross-section. The cavity 164 is configured to slidably receive the pole adapter 170. In some embodiments, the cavity 164 is elongately formed along—and configured to slidably receive the pole adapter 170 in a direction substantially parallel to the sidewall 112 partially defining interior space 116 and/or to one or more of the elongate slots 120 and 130. For instance, in the present embodiment, the elongate cavity 164 is elongately formed along the longitudinal direction z and is thus configured to receive the pole adapter 170 in the longitudinal direction z, i.e. in a direction substantially parallel to the sidewall 112 and to the elongate slots 120 and 130; this direction is also indicated by arrow 520 in FIG. 7.

Figure 5:
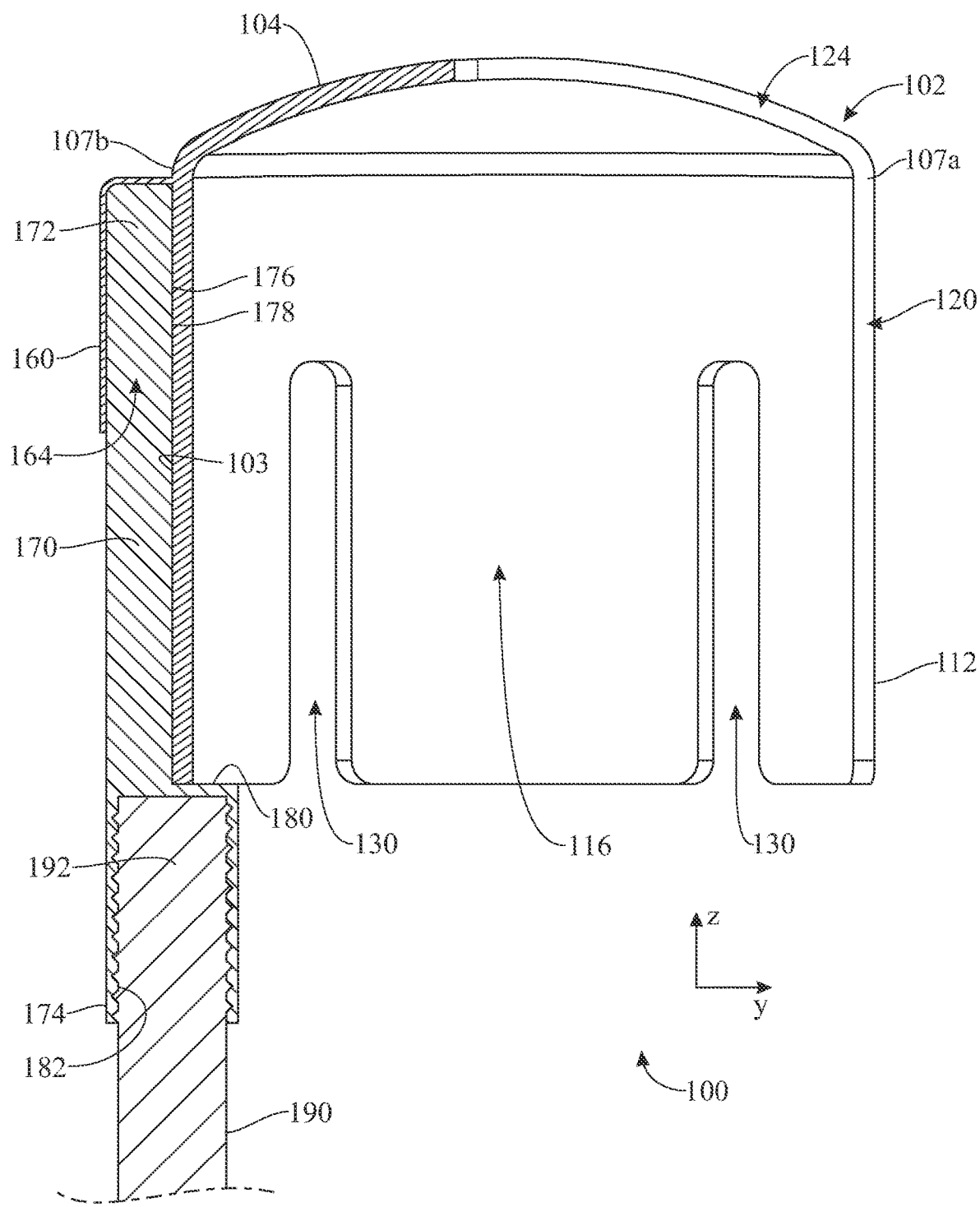
FIG. 5 presents a cross-sectional side elevation view of the protective cover, pole adapter and the pole illustrated in FIG. 1 taken along section plane 5-5 of FIG. 4.

The illustration of FIG. 3 shows the pole adapter 170 removed from the cavity 164 of the pole adapter receptacle 164. In turn, the illustrations of FIGS. 4 and 5 show the pole adapter 170 inserted into the cavity 164 of the pole adapter receptacle 160. The pole adapter 170 may be provided as part of an installation kit which may optionally include a pole 190 (described in greater detail hereinbelow), such as a broom pole or other pole or stick. The pole adapter 170 may be inserted into the cavity 164 of the pole adapter receptacle 160 disposed on the protective cover 102 and further attached to the pole 190 to place the protective cover 102 on a fruit on a tree. Attaching the pole 190 to the protective cover 102 provides the protective cover 102 with an extension what enables the protective cover 102 to be easily installed on the fruit of the tree by a worker from the ground level (as described more fully hereinbelow).

With continued reference to FIG. 3, the pole adapter 170 includes a distal or first end 172 and an opposite, proximal or second end 174. The first end 172 of the pole adapter 170 is configured to be inserted into the cavity 164 of the pole adapter receptacle 160 disposed on the protective cover 102, in a semi-interference (friction) type fitment or other type fitment. Preferably, the coupling between the first end 172 of the pole adapter 170 and the pole adapter receptacle 160 is such that relative movement therebetween is minimized or prevented, allowing to more firmly support the protective cover 102. In some embodiments, the first end 172 of the pole adapter 170 and the pole adapter receptacle 160 are shaped and sized to non-rotationally attach to one another; for instance, in the present embodiment, both the first end 172 of the pole adapter 170 and the cavity 164 of the pole adapter receptacle 160 are D-shaped and thus may non-rotationally adjust to one another if sized substantially the same so that the inner D-shape (the first end 172) cannot rotate within the outer D-shape (the pole adapter receptacle 160). As shown, the first end 172 of the pole adapter 170 may include a recessed portion 176 shaping the first end 172 into the substantially complementary D-shape (best seen in FIG. 7) that is inserted into the previously described substantially D-shaped cavity 164 of the pole adapter receptacle 160. As best shown in FIGS. 4 and 5, the recessed portion 176 of the first end 172 of the pole adapter 170 may be defined by longitudinal side surface 178 and a proximal end surface 180. In some embodiments, the longitudinal side surface 178 may be configured to abut against an outer side of the sidewall 112 of the protective cover 102, and more preferably, the longitudinal side surface 178 may be shaped and size to conform to the outer surface or side 103 of the sidewall 112 such that the longitudinal side surface 178 can mate flush with the complementary shaped sidewall 112 of the protective cover 102 when the pole adapter 170 is inserted inside the pole adapter receptacle 160; for example, in some embodiments, such as the present embodiment, the outer side of the sidewall 112 may be convex and the longitudinal side surface 178 may be concave and conforming in shape to the outer side of the sidewall 112. In turn, the proximal end surface 180 may be arranged transversely or substantially transversely, i.e. perpendicular or substantially perpendicular to the longitudinal direction z, and is configured to provide a resting or seating surface to the bottom edge of the sidewall 112 (i.e., to the second end 110 of the protective cover 102) when the pole adapter 170 is inserted inside the pole adapter receptacle 160, as best shown in FIG. 5. In some embodiments, such as the present embodiment, the proximal end surface 180 may be flat.

As further shown in FIG. 3, the second end 174 of the pole adapter 170 may include a socket 182 formed therein for receiving and securing to the pole 190 during use. The socket 182 is sized and shaped to receive an end of the pole 190 and is secured to the pole 190 as described more fully hereinbelow.

In an illustrated embodiment and referring particularly to FIGS. 3 and 5, the pole 190 includes a first end 192 which is installed into the socket 182 of the pole adapter 170. In some implementations, the first end 192 may include threads for engaging complementary threads provided in the socket 182; however, alternative or additional connections between the pole 190 and the pole adapter 170 are contemplated such as, but not limited to, friction-fitting, bayonet fastener, spring-loaded fastener, etc. The pole 190 is installed by inserting the first end 192 into the socket 182 and, if applicable, aligning the threads on the first end 192 with the threads in the socket 182 and rotating in the direction of arrows 500 until a snug or tight threaded connection or other connection (bayonet, frictional, etc.) is achieved.

In some embodiments, when the pole 190 and pole adapter 170 are coupled to the pole adapter receptacle 160, the pole 190 is oriented substantially parallel to the cavity 164 of the pole adapter receptacle 160 of the protective cover 102 and to the sidewall 112 and thus the interior space 116 of the protective cover 102. For instance, in the present embodiment, when the pole 190 and pole adapter 170 are connected to the protective cover 102, the pole 190 and sidewall 112 of the protective cover 102 are arranged in the longitudinal direction z. Furthermore, as shown, when connected to the protective cover 102, the pole 190 is arranged generally perpendicular to the opening 118 which provides access to the interior space 116 of the protective cover 102. Having the pole 190 parallel to the sidewall 112 and perpendicular to the opening 118 allows the pole 190 to serve as a guide or reference as to how to operate the protective cover system 100 in order to insert the produce into the interior space 116 of the protective cover 102. Specifically, by simply and intuitively pulling the pole 190 towards them, a user is able to easily cause the protective cover 102 to be fitted over the produce. In this way, the protective cover system 100 contributes to facilitate the placement of the produce item into the interior space 116 from the ground level.

Figure 7:
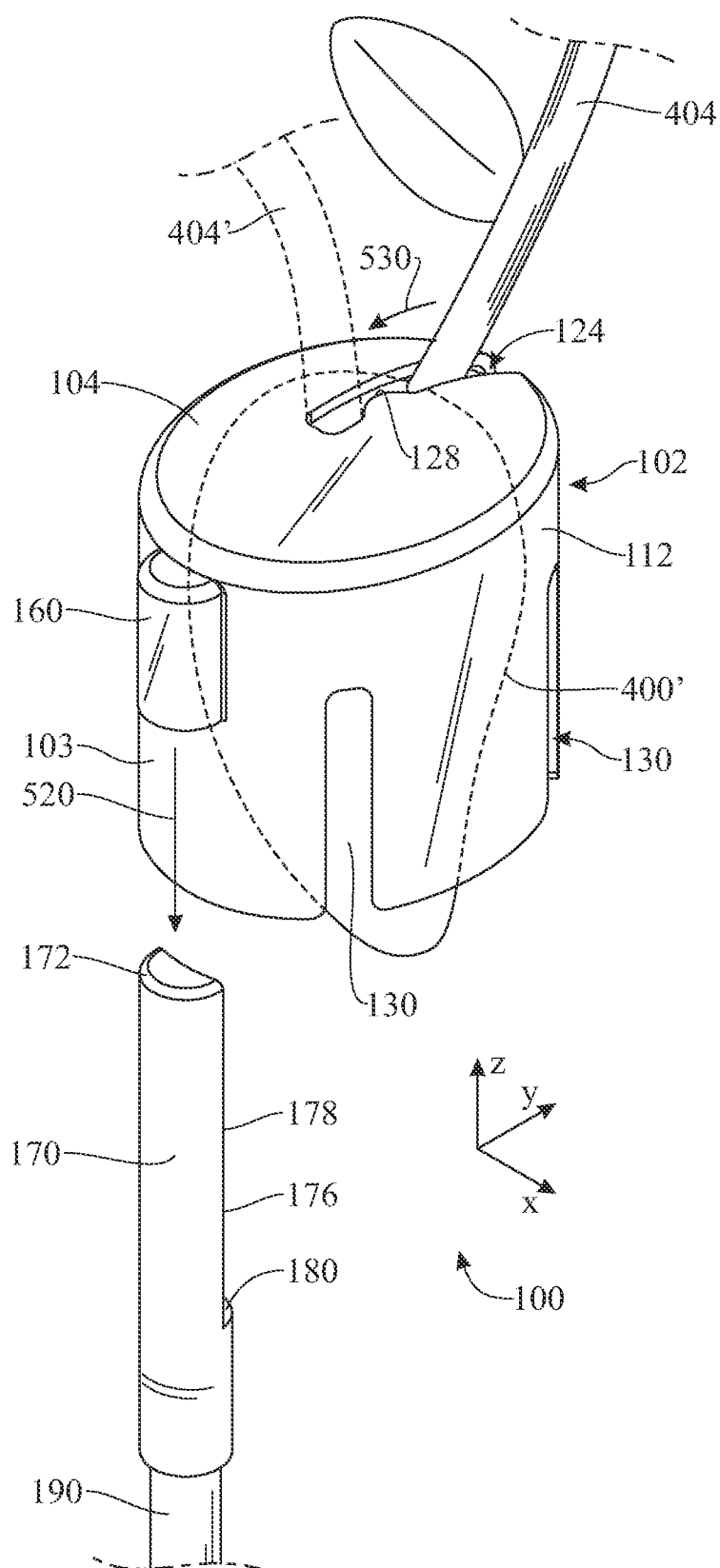
FIG. 7 presents a partially exploded isometric view of the protective cover of FIG. 1, illustrating placement of the protective cover on the tree branch using the elongated slot formed in the sidewall and the elongated slot formed in the end wall, the tree branch being secured within the elongated slot formed in the end wall using the tab, and further illustrating removal of the pole and pole adapter from the protective cover.

Once the protective cover 102 has been placed over the produce to be protected, the pole 190 and optionally the pole adapter 170 may be disconnected from the protective cover 102. For instance, both the pole 190 and pole adapter 170 may be jointly disconnected from the protective cover 102 by simply pulling the pole 190. Because the pole 190 is threaded or otherwise non-axially-movably connected to the pole adapter 170, pulling on the pole 190 will cause the pole adapter 170 to slide out of the cavity 164 of the pole adapter receptacle 160 (FIG. 7). Thus, once the protective cover 102 has been securely placed, the pole 190 and pole adapter 170 may be jointly removed and attached to a second protective cover 102 to place the second protective cover 102 onto another produce item. Thus, the pole 190 and pole adapter 170 may be used to easily and rapidly place a plurality of protective covers 102 onto a tree or plant. In some cases, the user may wish to leave the pole adapter 170 connected to the protective cover 102, or may wish to simply disconnect the pole adapter 170 from the pole 190; in both cases, removal of the pole 190 from the pole adapter 170 is facilitated by rotating the pole 190 in the opposite directions of arrows 500 until the first end 192 is clear of the socket 182.

In another embodiment, the socket 182 and the first end 192 of the pole 190 may not be threaded and the first end 192 of the pole 190 may be secured into the socket 182 in a semi-interference type fitment or other type fitment.

In some embodiments, the optional installation kit including the pole adapter 170 and the optional pole 190 are not required for placement of the protective cover 102. For instance, the protective cover 102 may be manually placed on fruits and vegetables on small trees or bushes, and on plants on the ground level.

Figure 6:
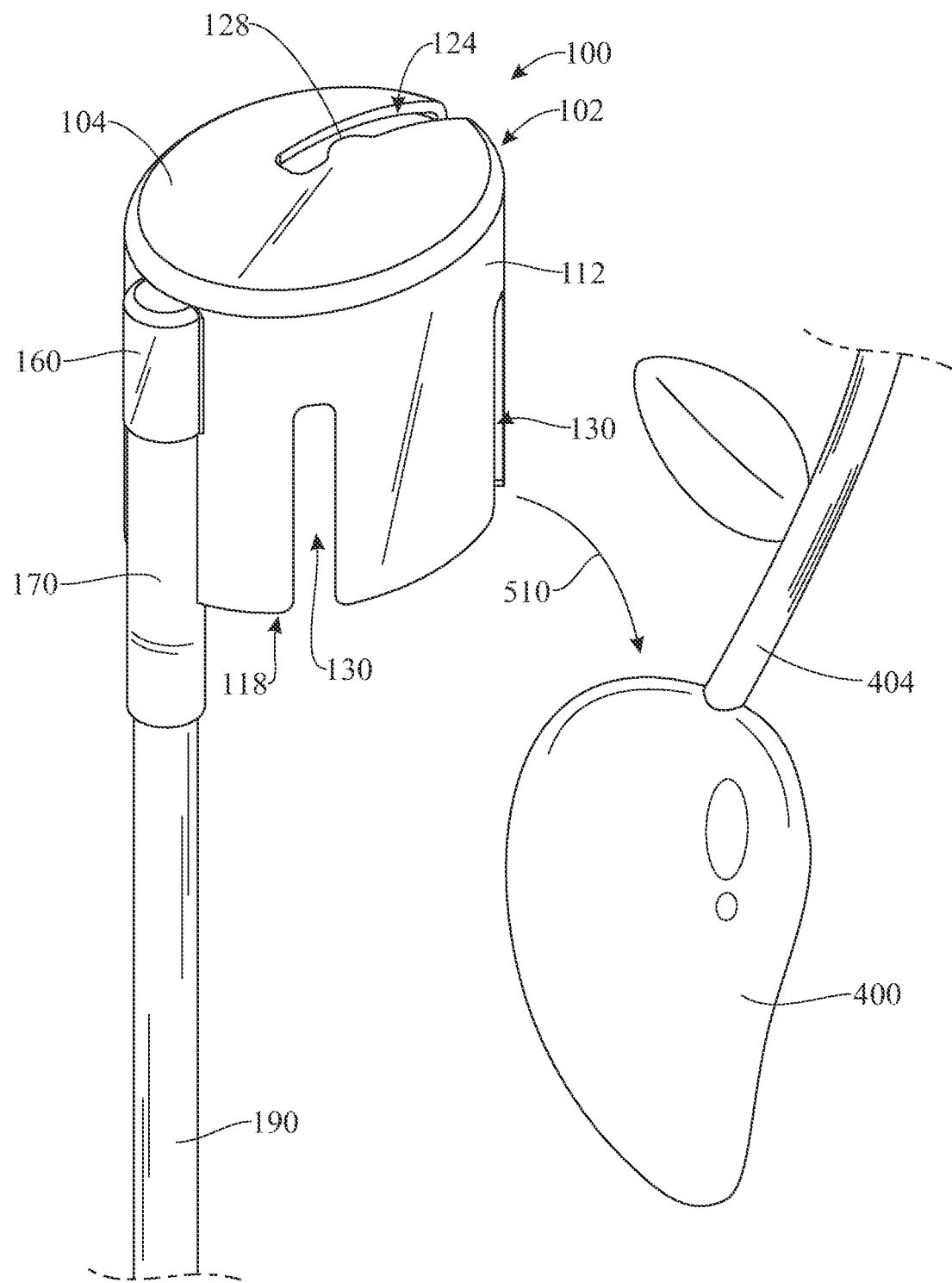
FIG. 6 presents a top isometric view of the protective cover, pole adapter and the pole illustrated in FIG. 1, with the pole installed in the pole adapter, and the pole adapter inserted into the cavity of the pole adapter receptacle, and illustrating the intended positioning of the protective cover on an illustrative produce item on a tree branch using one of the elongated slots formed in the sidewall.

Referring now also to FIGS. 6 and 7, there is illustrated an example of use of the protective cover system 100 to facilitate placement of a produce item 400 inside the protective cover 102. As shown in FIG. 6, the protective cover system 100 is initially set up with the pole adapter 170 installed in the cavity 164 of the pole adapter receptacle 160 of the protective cover 102 and the pole 190 connected to the pole adapter 170. The user then manipulates the pole 190 from ground level, to move the protective cover 102 as indicated schematically by arrow 510, so that the elongated slot 120 on the sidewall 112 becomes aligned with a tree branch 404 having a produce item 400 attached at a distal end thereof, and the bottom opening 118 faces the produce item 400. The protective cover 102 is then cupped over the produce item 400 such that the produce item 400 is inserted through the opening 118 and received within the interior space 116 while the tree branch 404 is inserted into the elongated slot 120 of the protective cover 102, and optionally into the elongated slot 124 which extends from the elongated slot 120. For example, as shown in the figures, the tree branch 404 may be inserted into the elongated slots 120 and 124 formed on the side and top of the protective cover 102, respectively. The tree branch 404 may be inserted sufficiently into the elongated slot 124 such that the tree branch 404 reaches a terminal end of the elongated slot 124. In some implementations, the tree branch 404 may be inserted into one of the elongated slots 130 formed on the sidewall 112; however, it is preferred that said elongated slots 130 are used for the passage of air, water, pesticides, and/or other substances, products or agents from outside the protective cover 102 to the interior space 116. In other words, in a preferred method of operation of the protective cover system 200, the tree branch is inserted into the L-shaped slot 120, 124 and the auxiliary, shorter elongated slots 130 are used instead for the passage of air, water, pesticides, etc.

An example of such preferred method is depicted herein, where the elongated slots 120 and 124 are selected for use to secure the protective cover 102 to the tree branch 404, as shown in FIG. 7. Specifically, the tree branch 404 may be directed into the elongated slot 120 and further directed into the elongated slot 124 until the tree branch 404 is moved laterally, in the direction of arrow 530, to a position past the tab 128 and approximately within the medial region of the end wall 104, as indicated by reference numeral 404'. In turn, the produce item 400 is housed within the interior space 116 of the protective cover 102 and indicated in the drawing by reference numeral 400'. Once the produce item 400' has been secured within the interior space 116 of the protective cover 102, the tool adapter 170 attached to the pole 190 may be removed from the cavity 164 of the pole adapter receptacle 160 by simply pulling on the pole 190 in the direction of arrow 520 leaving the protective cover 102 on the tree. Alternatively, the user may choose to rotate the pole 190 relative to the pole adapter 170 to disconnect the pole 190 from the pole adapter 170 with the pole adapter 170 remaining inserted (e.g., frictionally) within the pole adapter receptacle 160.

Once the protective cover 102 is placed over the produce item 400', the protective cover will allow for water penetration and airflow towards the produce item 400', thus improving the growth and allowing a proper preservation of the produce item 400'. More specifically, water and air may be able to pass through the elongated slots 120, 124 and 130 and into and through the protective cover 102. In farming systems where insecticides, pesticides and/or other treatments are used, the aforementioned slots may also allow such substances to penetrate towards the produce item 400' housed and protected by the protective cover 102. Furthermore, the protective cover 102 may be configured to allow natural UV light to pass therethrough towards the produce item 400', thus further contributing to improve growth of the produce item 400' within the protective cover 102. For example, the protective cover 102 may be transparent or translucent and formed in material(s) configured to allow the passage therethrough of natural UV light.

Figure 8:
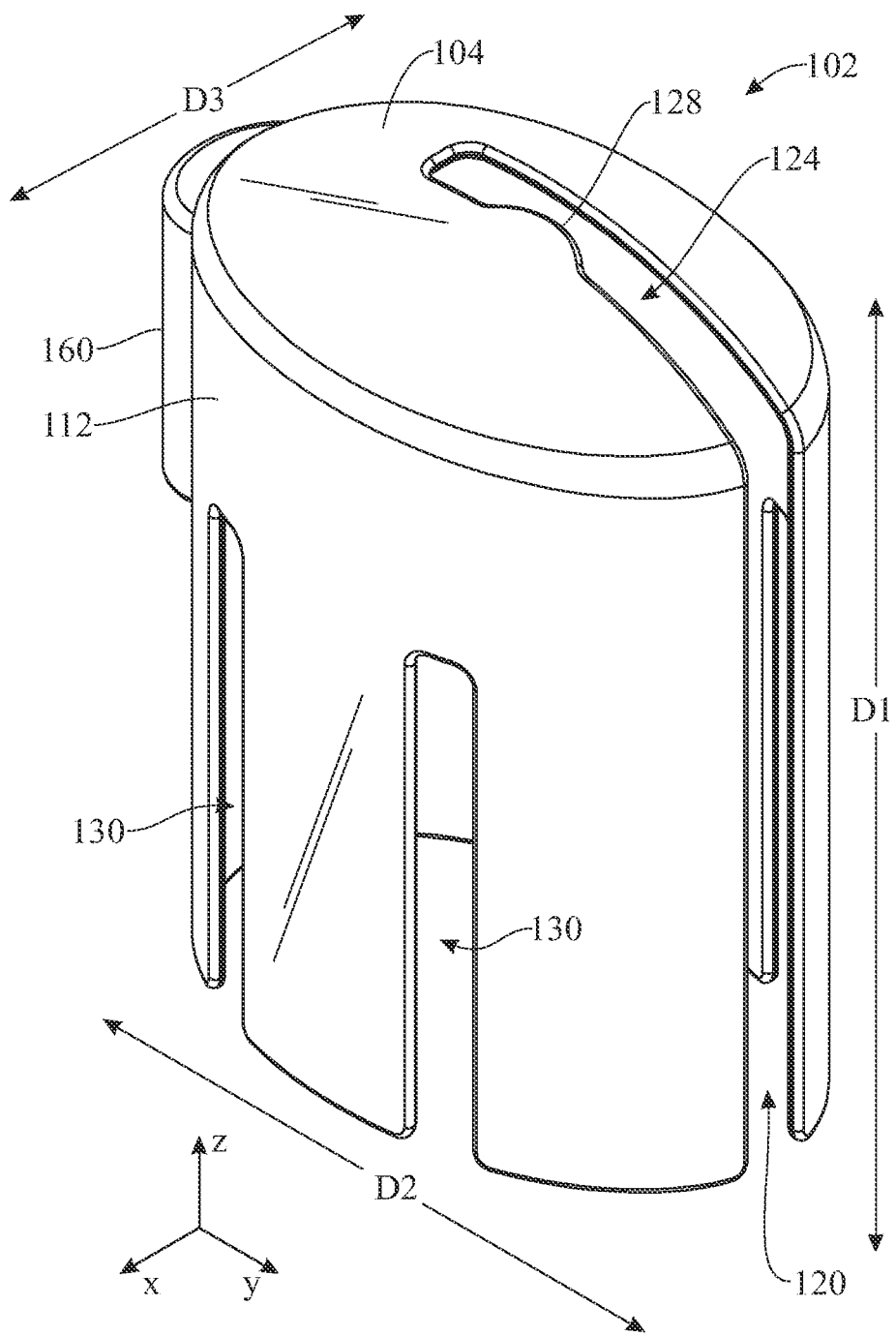
FIG. 8 presents an isometric view of the protective cover of FIG. 1, illustrating the dimensions of the protective cover.

Referring now also to FIG. 8, there is illustrated a further view of the protective cover 102 of the protective cover system 100. As shown, the protective cover 102 may have a generally elliptical cross-section (along section plane x-y). However, alternative embodiments are contemplated in which the protective cover 102 may have a round, square, rectangular, or other cross-section, or may be shaped similarly to a specific fruit or produce, for instance and without limitation. The protective cover 102 and/or pole adapter 170 of the protective cover system 100 may be formed of any suitable material such as, but not limited to, plastic. The protective cover 102 is a relatively rigid and hard shell configured to protect the produce items from damage from animals, wind and the like. In some embodiments, the protective cover 102 may be formed as a single-piece unit such as by plastic injection molding. Furthermore, the size of the protective cover 102 may vary to accommodate small to large produce items. For instance, in some embodiments, the protective cover 102 may have a height D1 from 4 to 10 inches, a depth D2 from 4 to 10 inches, and a width D3 from 4 to 10 inches, with D1, D2 and D3 being the dimensions of the protective cover 102 along the longitudinal direction z, lateral direction y, and transverse direction x. These dimensions are merely illustrative and should not be understood as limiting.

In some embodiments, the protective cover 102 may be translucent, and more preferably, transparent for allowing viewing of the produce item. For example, it is contemplated that one or both of the end wall 104 and sidewall 112 are transparent or translucent. In preferred embodiments, the protective cover 102 is integrally-formed into a single-piece unit, as mentioned heretofore, and made of a transparent or translucent plastic material such that the entire protective cover 102 is transparent or translucent.

In some embodiments, the end wall 104 and sidewall 112 of the protective cover 102 may be made relatively thick (for example, having a thickness of at least ¼ of an inch), so that the protective cover 102 is durable and does not break if it falls off the tree or plant. In other embodiments, the end wall 104 and sidewall 112 of the protective cover 102 may be relatively thin (for example, having a thickness less than or equal to ⅛ of an inch), to facilitate disposable commercial usage of the protective cover 102.

Alternative embodiments are contemplated to those shown and/or described herein. For example, the pole adapter and pole may be non-separately adjoined into a single unit. In some cases, the pole adapter and pole may be integrally formed into a single-piece unit, made for instance of plastic, metal or wood. In other embodiments, the pole may be directly connected to the protective cover, such as by a threaded connection, friction fitting, clamp, or other mechanism.

The illustrations of FIGS. 9-12 show a protective cover system 200 for protecting one or more produce items, in accordance with a second illustrative embodiment of the invention. Similarly to the previous embodiment, the protective cover system 200 comprises a generally rigid, protective cover 202 defining an interior space 216 configured to receive at least one produce item (e.g., fruit 400 shown in FIG. 6). The protective cover 202 includes an opening 218 providing access to the interior space 216 for inserting the at least one produce item through the opening 218 and into the interior space 216. Also similarly to the previous embodiment, the protective cover 202 further includes a pole adapter receptacle 260, which protrudes outwardly and may be shaped and sized similarly or identically as the pole adapter receptacle 160 described heretofore with reference to FIGS. 1-8. The pole adapter receptacle 260 defines a cavity 264 which is separate from the interior space 216 of the protective cover 202. The protective cover system 200 further includes a pole adapter 270, formed as a separate piece relative to the protective cover 202 and configured to extend from and be carried by a pole 290. A first end 272 of the pole adapter 270 is slidably and removably insertable into the cavity 264 of the pole adapter receptacle 260.

Figure 9:
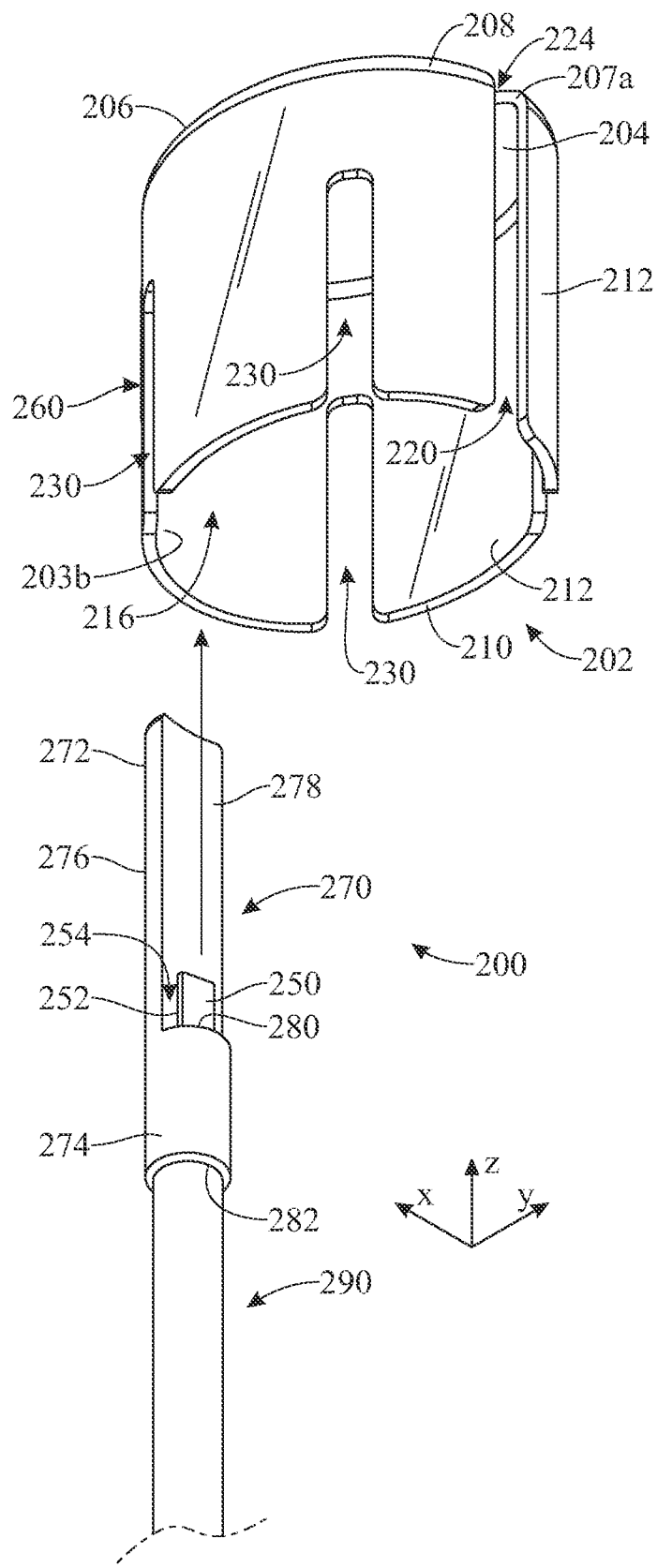
FIG. 9 presents a bottom isometric view of a protective cover, pole adapter and pole in accordance with a second illustrative embodiment of the invention, wherein the pole adapter is shown attached to the pole and detached from the pole adapter receptacle on the protective cover.
Figure 10:
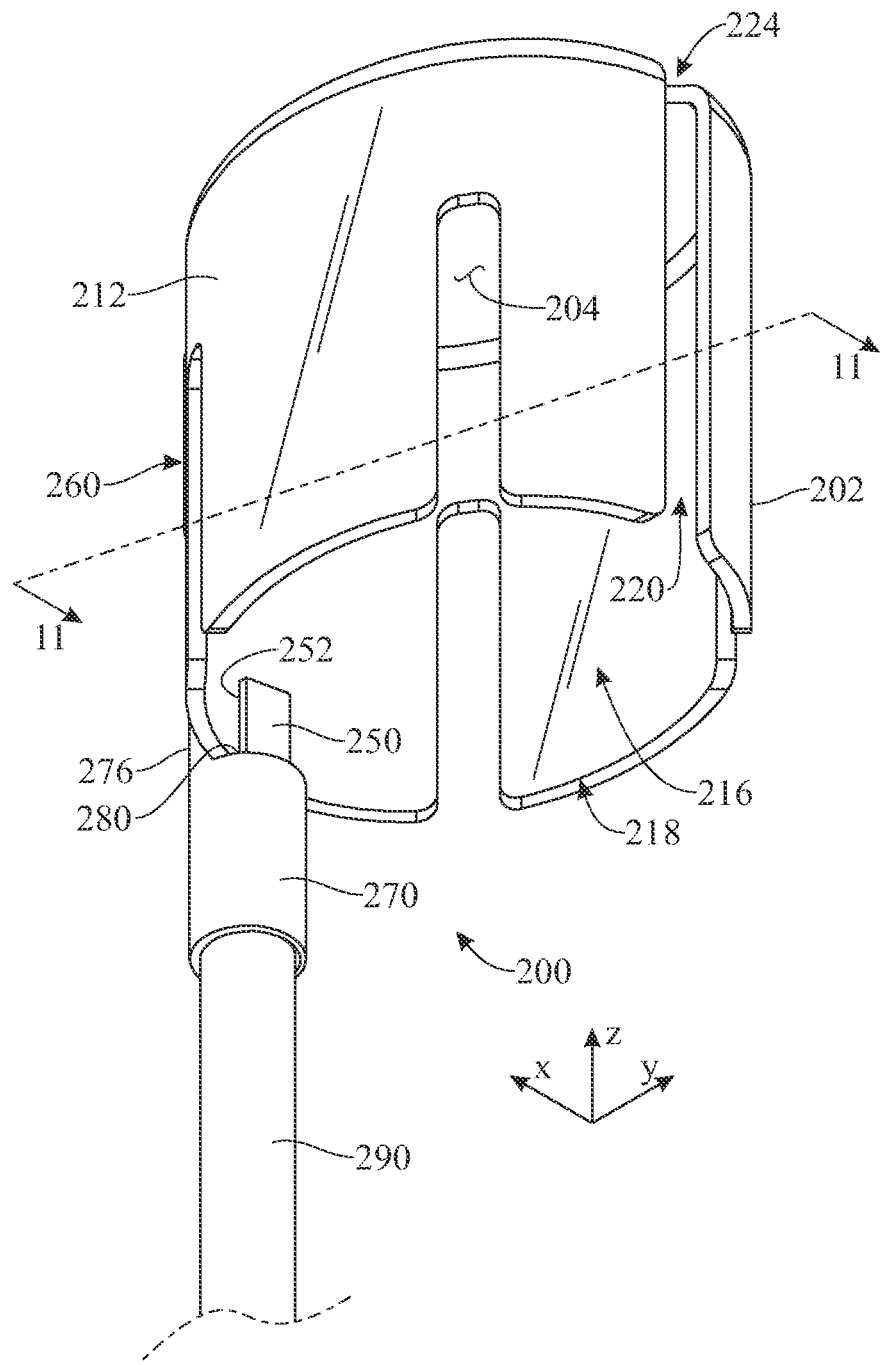
FIG. 10 presents a bottom isometric view of the protective cover, pole adapter and pole of FIG. 9, shown assembled.

Also similarly to the previous embodiment, the protective cover 202 comprises an end wall 204 and a sidewall 212 extending from the end wall 204, wherein the end wall 204 and the sidewall 212 form an inverted cup-shape and jointly define the interior space 216 of the protective cover 202. As can be seen in FIGS. 9 and 10, the opening 218 is provided at a bottom end or edge of the sidewall 212, opposite the end wall 204. As with the previous embodiment, the sidewall 212 extends from and along a peripheral edge of the end wall 204 and encircles the interior space 216 of the protective cover 202. Furthermore, the sidewall 212 of the protective cover 202 is arranged generally parallel to or along the longitudinal direction z, and thus parallel to the pole 290 when the protective cover system 200 is arranged in the assembled configuration. The end wall 204 of the protective cover 202 is arranged generally transverse to the longitudinal direction z when the protective cover system 200 is arranged in the assembled configuration.

Figure 11:
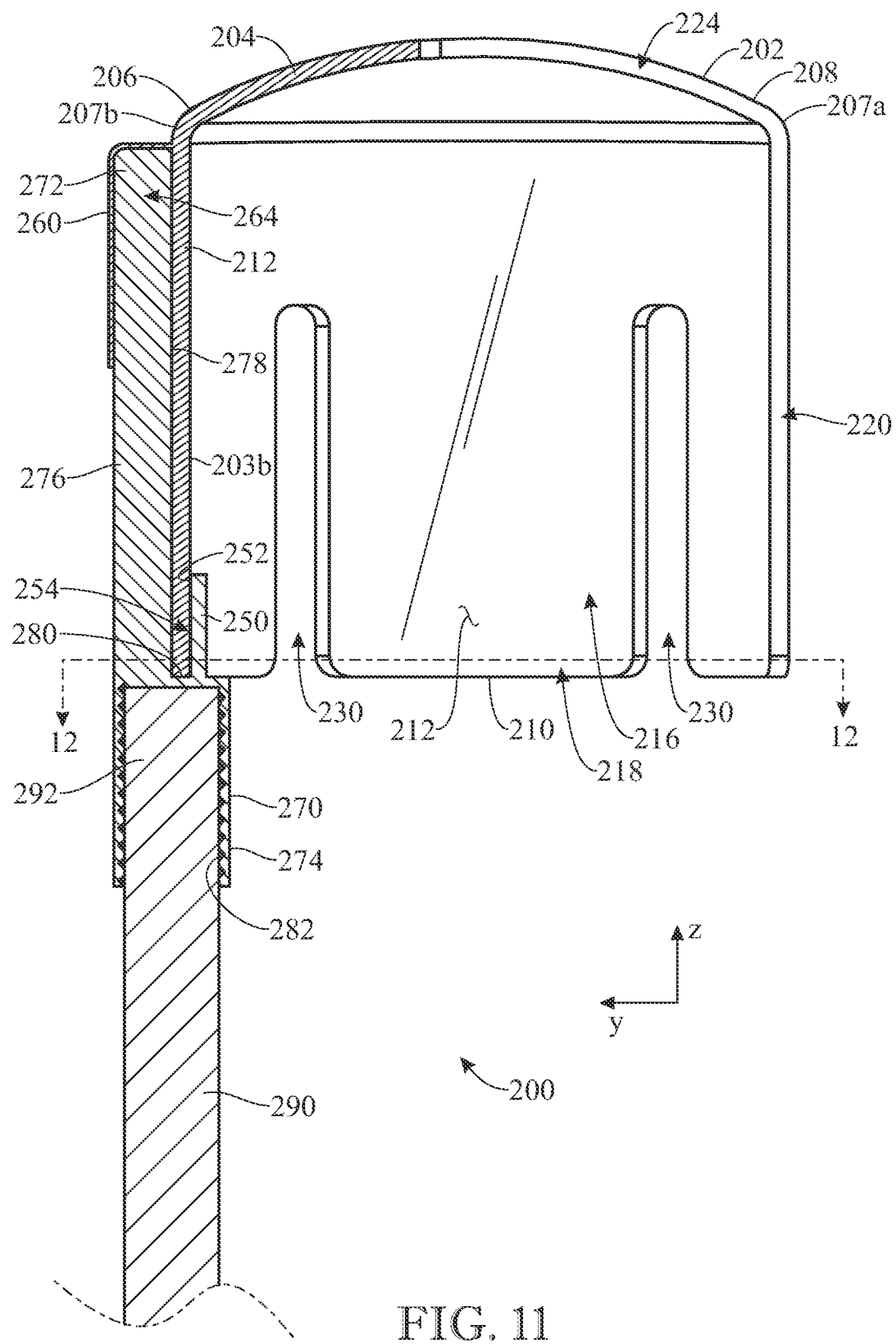
FIG. 11 presents a cross-sectional side elevation view of the assembly of FIG. 10, the cross-section taken along section plane 11-11 indicated in FIG. 10.

As shown in FIGS. 9-11, the protective cover 202 may include one or more elongated slots 220, 224, 230 formed along the protective cover 202. The elongated slots, and more preferably, the elongated slots 220, 224, are used for receiving a tree branch or plant vine associated to the at least one produce item received within the interior space 216 (e.g., tree branch 404 associated to fruit 400 shown in FIG. 6), while all elongated slots 220, 224 and 230 may also allow for the passage of air, water, pesticides or other necessary substances. Similarly to the previous embodiment, one or more of the elongated slots 220, 224, 230 may include at least one inwardly-directed tab, similar to tab 128 of FIG. 1, which forms a narrowing in the slot that provides some retention of the tree branch or plant vine inside the slot. At least one elongated slot 220, 230 of the one or more elongated slots extends in the longitudinal direction z. Alternatively or additionally, at least one elongated slot 220, 230 of the one or more elongated slots extends from the end of the sidewall 212 opposite the end wall 204, towards the end wall 204. For instance, in the present embodiment, similarly to the previous embodiment, a plurality of elongated slots 220, 230 extend along the sidewall 212, from the end of the sidewall 212 opposite the end wall 204, and in the longitudinal direction z. In addition, similarly to the previous embodiment, the one or more elongated slots 220, 224, 230 include may include a first elongated slot 220 extending from the end of the sidewall 212 opposite the end wall 204 to the end wall 204, and a second elongated slot 224 extending from the first elongated slot 220 and along the end wall 204. The second elongated slot 224 may extend from the first elongated slot 220 at a first side 207a of a peripheral edge 206 of the end wall 204, partially across the end wall 204, and towards an opposite side 207b of the end wall 204, at which the pole adapter receptacle 260 is located.

Figure 12:
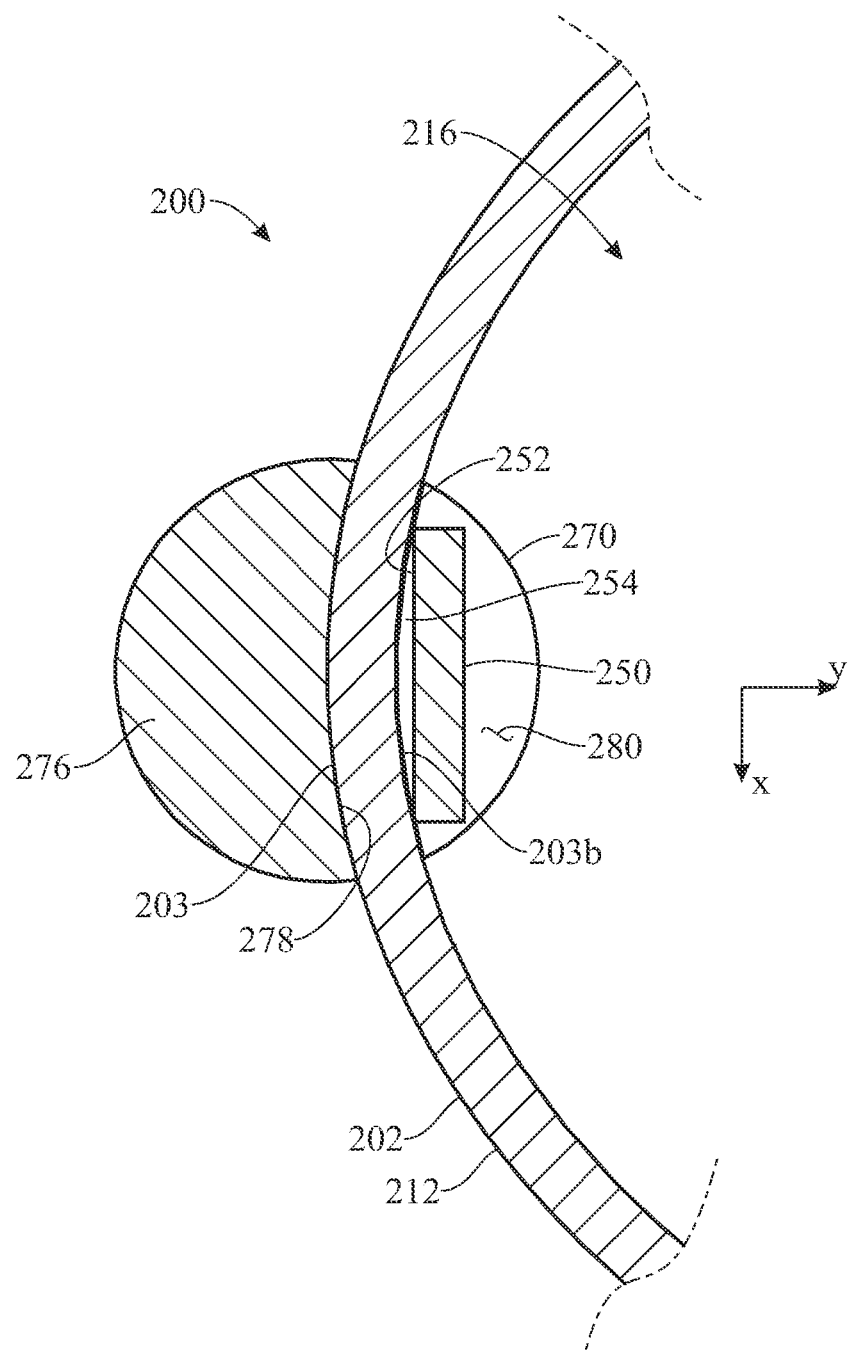
FIG. 12 presents a cross-sectional top plan view of the assembly of FIG. 11, the cross-section taken along section plane 12-12 indicated in FIG. 11.

Similarly to the previous embodiment, the protective cover system 200 is configured to adopt an assembled configuration, shown in FIGS. 10-12, in which the pole adapter 270 is removably inserted in the cavity 264 of the pole adapter receptacle 260 and the pole adapter 270 carries a pole 290 such that the pole 290 extends away from the interior space 216 of the protective cover 202 in the longitudinal direction z. In this assembled configuration, the pole 290 is attached to the protective cover 202 via the pole adapter 270, and a user may operate the pole 290 to maneuver the protective cover 202 and position the protective cover 202 over and onto a produce item, or to remove the protective cover 202 from a produce item.

In different implementations of the invention, the pole adapter may be disconnectably attachable to the pole, non-disconnectably attached to the pole, or integrally formed with the pole. For instance, the pole adapter 270 of the present embodiment is disconnectably attachable to a first end 292 of the pole 290. Specifically, similarly to the previous embodiment, external threads on the first end 292 of the pole 290 are threadable to a threaded socket 282 provided at a second end 274 of the pole adapter 270 opposite to the first end 272 of the pole adapter 270.

Similarly to the previous embodiment, the cavity 264 of the pole adapter receptacle 260 may be elongated along the longitudinal direction z. The pole adapter 270 may include an elongated recessed portion 276 defined by a side surface 278 and a proximal end surface 280. In the assembled configuration of the protective cover system 200, the elongated recessed portion 276 may be received in the cavity 264 of the pole adapter receptacle 260, and an edge or end 210 of the protective cover 202, opposite the first end 208 at which the end wall 204 is arranged, may rest against the proximal end surface 280 of the pole adapter 270. In turn, as best shown in FIG. 12, and similarly to the previous embodiment, the side surface 278 of the elongated recessed portion 276 of the pole adapter 270 may be shaped and sized to conform to an outer surface or side 203 of the protective cover 202 on which the side surface 278 rests when the protective cover system 200 is arranged in the assembled configuration.

Preferably, as shown, the pole adapter 270 is non-rotationally received in the cavity 264 of the pole adapter receptacle 260 when the protected cover assembly is arranged in the assembled configuration, to provide stability to the protective cover 202 and facilitate threading and unthreading (or otherwise connecting and disconnecting) of the pole 290 and the pole adapter 270. For instance and without limitation, the cavity 264 of the pole adapter receptacle 260 and the recessed portion 276 of the pole adapter 270 may be D-shaped.

As shown in FIGS. 9 and 10, the pole adapter 270 of the present embodiment further includes a tab 250 configured to further enhance the grip or connection between the pole adapter 270 and the protective cover 202. As shown in the figures, and further shown in the cross-sectional view of FIG. 11, the tab 250 extends from the proximal end surface 280 of the elongated recessed portion 276, and is formed as a relatively planar body or plate comprising a first side 252 which faces the side surface 278 of the elongated recessed portion 276 of the pole adapter 270. The tab 250 is arranged in spaced-apart relationship with the elongated recessed portion 276 of the pole adapter 270, such that a gap 254 is defined between the tab 250 and the side surface 278 of the elongated recessed portion 276. As best shown in FIGS. 10 and 11, in the assembled configuration of the protective cover system 200, a portion of the sidewall 212 of the protective cover 202 is received within said gap 254, sandwiched between the elongated recessed portion 276 and the tab 250, and thus laterally stabilized by the elongated recessed portion 276 and the tab 250. The portion of the sidewall 212 of the protective cover 202 may be slidably fitted into the gap 254 and slidably removed from the gap 254 during manual operation of the protective cover system 200.

In some embodiments, such as the present embodiment, the first side 252 of the tab 250 may be flat, as best shown in FIG. 12, to facilitate insertion and removal of the sidewall 212 into and from the gap 254. However, alternative embodiments are contemplated. For example, the first side 252 of the tab 250 may be curved, and shaped and sized to conform to the curved profile of an inner side 203b of the sidewall 212, to further increase stabilization of the protective cover 202 when the protective cover system 200 is arranged in the assembled configuration.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A protective cover system for protecting one or more produce items, comprising:
   a rigid, protective cover defining an interior space configured to receive at least one produce item, the protective cover comprising an opening providing access to the interior space for inserting the at least one produce item through the opening and into the interior space, the protective cover further comprising a pole adapter receptacle defining a cavity; and
   a pole adapter, formed as a separate piece relative to the protective cover and configured to extend from and be carried by a pole, the pole adapter slidably and removably insertable into the cavity of the pole adapter receptacle; wherein
   the protective cover system is configured to adopt an assembled configuration in which the pole adapter is removably inserted in the cavity of the pole adapter receptacle and the pole adapter carries a pole such that the pole extends away from the interior space of the protective cover in a longitudinal direction; wherein
   the protective cover further comprises one or more elongated slots formed along the protective cover, wherein at least one elongated slot of the one or more elongated slots comprises an inwardly-directed tab providing a narrowing of said at least one elongated slot.

2. The protective cover system of claim 1, wherein the protective cover comprises an end wall and a sidewall extending from the end wall, wherein the end wall and the sidewall define the interior space of the protective cover, and wherein the opening is provided at an end of the sidewall opposite the end wall.

3. The protective cover system of claim 2, wherein the sidewall extends from and along a peripheral edge of the end wall and encircles the interior space of the protective cover.

4. The protective cover system of claim 2, wherein the sidewall of the protective cover is arranged generally parallel to the longitudinal direction when the protective cover system is arranged in the assembled configuration.

5. The protective cover system of claim 4, wherein the end wall of the protective cover is arranged generally transverse to the longitudinal direction when the protective cover system is arranged in the assembled configuration.

6. The protective cover system of claim 1, wherein the cavity of the pole adapter receptacle is elongately formed along said longitudinal direction.

7. The protective cover system of claim 1, wherein at least one elongated slot of the one or more elongated slots extends in the longitudinal direction.

8. The protective cover system of claim 1, wherein the protective cover comprises an end wall and a sidewall extending from the end wall, wherein the end wall and the sidewall define the interior space of the protective cover, and wherein the opening is provided at an end of the sidewall opposite the end wall, and further wherein at least one elongated slot of the one or more elongated slot extends from the end of the sidewall opposite the end wall towards the end wall.

9. The protective cover system of claim 1, wherein the protective cover comprises an end wall and a sidewall extending from the end wall, wherein the end wall and the sidewall define the interior space of the protective cover, and wherein the opening is provided at an end of the sidewall opposite the end wall, and further wherein at least one elongated slot of the one or more elongated slot comprises a first elongated slot extending from the end of the sidewall opposite the end wall to the end wall and a second elongated slot extending from the first elongated slot and along the end wall.

10. The protective cover system of claim 9, wherein the second elongated slot extends from the first elongated slot, partially across the end wall and towards an opposite side of the end wall, at which the pole adapter receptacle is located.

11. The protective cover system of claim 1, wherein the pole adapter is disconnectably attachable to a pole.

12. The protective cover system of claim 1, further comprising said pole.

13. The protective cover system of claim 1, wherein the pole adapter comprises an elongated recessed portion defined by a side surface and a proximal end surface, wherein, in the assembled configuration of the protective cover system, an edge of the protective cover rests against the proximal end surface of the elongated recessed portion of the pole adapter.

14. The protective cover system of claim 13, wherein the side surface of the elongated recessed portion of the pole adapter is configured to conform to an outer side of the protective cover on which said side surface rests when the protective cover system is arranged in the assembled configuration.

15. The protective cover system of claim 13, wherein the pole adapter further comprises a tab extending from the proximal end surface of the elongated recessed portion in spaced-apart relationship with the side surface of the elongated recessed portion of the pole adapter, such that a gap is defined between the tab and the side surface, wherein, in the assembled configuration of the protective cover system, the protective cover is received within said gap.

16. The protective cover system of claim 1, wherein the pole adapter is non-rotationally received in the cavity of the pole adapter receptacle when the protected cover assembly is arranged in the assembled configuration.

17. A protective cover system for protecting one or more produce items, comprising:
a rigid, protective cover defining an interior space configured to receive at least one produce item, the protective cover comprising an end wall and a sidewall extending from the end wall, wherein the end wall and the sidewall define the interior space, the protective cover further comprising an opening providing access to the interior space for inserting the at least one produce item through the opening and into the interior space, the opening provided at an end of the sidewall opposite the end wall, the protective cover further comprising a pole adapter receptacle defining a cavity; and
a pole adapter, formed as a separate piece relative to the protective cover and configured to extend from and be carried by a pole, the pole adapter slidably and removably insertable into the cavity of the pole adapter receptacle; wherein
the protective cover system is configured to adopt an assembled configuration in which the pole adapter is removably inserted in the cavity of the pole adapter receptacle and the pole adapter carries a pole such that the pole extends away from the interior space of the protective cover in a longitudinal direction; wherein
the protective cover further comprises one or more elongated slots formed along the protective cover, wherein at least one elongated slot of the one or more elongated slot comprises a first elongated slot extending from the end of the sidewall opposite the end wall to the end wall and a second elongated slot extending from the first elongated slot and along the end wall.

18. The protective cover system of claim 17, wherein the second elongated slot extends from the first elongated slot, partially across the end wall and towards an opposite side of the end wall, at which the pole adapter receptacle is located.

19. A protective cover system for protecting one or more produce items, comprising:
a rigid, protective cover defining an interior space configured to receive at least one produce item, the protective cover comprising an opening providing access to the interior space for inserting the at least one produce item through the opening and into the interior space, the protective cover further comprising a pole adapter receptacle defining a cavity; and
a pole adapter, formed as a separate piece relative to the protective cover and configured to extend from and be carried by a pole, the pole adapter slidably and removably insertable into the cavity of the pole adapter receptacle, the pole adapter comprising an elongated recessed portion defined by a side surface and a proximal end surface; wherein
the protective cover system is configured to adopt an assembled configuration in which the pole adapter is removably inserted in the cavity of the pole adapter receptacle and the pole adapter carries a pole such that the pole extends away from the interior space of the protective cover in a longitudinal direction, and further in which an edge of the protective cover rests against the proximal end surface of the elongated recessed portion of the pole adapter.

20. The protective cover system of claim 19, wherein the side surface of the elongated recessed portion of the pole adapter is configured to conform to an outer side of the protective cover on which said side surface rests when the protective cover system is arranged in the assembled configuration.

21. The protective cover system of claim 19, wherein the pole adapter further comprises a tab extending from the proximal end surface of the elongated recessed portion in spaced-apart relationship with the side surface of the elongated recessed portion of the pole adapter, such that a gap is defined between the tab and the side surface, wherein, in the assembled configuration of the protective cover system, the protective cover is received within said gap.

* * * * *